(12) United States Patent
Hoss et al.

(10) Patent No.: US 8,634,192 B2
(45) Date of Patent: Jan. 21, 2014

(54) INFORMATION HANDLING SYSTEM COOLING SYSTEM

(75) Inventors: Shawn Paul Hoss, Round Rock, TX (US); Paul Theodore Artman, Austin, TX (US)

(73) Assignee: Dell Products L.P., Round Rock, TX (US)

(*) Notice: Subject to any disclaimer, the term of this patent is extended or adjusted under 35 U.S.C. 154(b) by 298 days.

(21) Appl. No.: 13/236,323

(22) Filed: Sep. 19, 2011

(65) Prior Publication Data
US 2013/0070409 A1 Mar. 21, 2013

(51) Int. Cl.
*H05K 7/20* (2006.01)

(52) U.S. Cl.
USPC ............ 361/695; 361/694; 361/699; 361/696

(58) Field of Classification Search
None
See application file for complete search history.

(56) References Cited

U.S. PATENT DOCUMENTS

| | | | |
|---|---|---|---|
| 5,504,924 A * | 4/1996 | Ohashi et al. | 361/676 |
| 5,709,100 A | 1/1998 | Baer et al. | |
| 5,796,580 A * | 8/1998 | Komatsu et al. | 361/679.48 |
| 6,345,512 B1 | 2/2002 | Cosley et al. | |
| 6,837,063 B1 | 1/2005 | Hood, III et al. | |
| 7,660,109 B2 * | 2/2010 | Iyengar et al. | 361/679.47 |
| 7,788,940 B2 * | 9/2010 | Madara et al. | 62/259.2 |
| 2002/0117291 A1 * | 8/2002 | Cheon | 165/80.4 |
| 2003/0147216 A1 * | 8/2003 | Patel et al. | 361/700 |
| 2010/0309622 A1 * | 12/2010 | Zimmermann et al. | 361/679.41 |
| 2012/0224322 A1 * | 9/2012 | Artman et al. | 361/679.48 |

* cited by examiner

*Primary Examiner* — Gregory Thompson
(74) *Attorney, Agent, or Firm* — Haynes and Boone, LLP

(57) ABSTRACT

An information handling system (IHS) cooling system includes an IHS chassis defining an IHS chassis air inlet. A cooling chassis supports the IHS chassis on a support base. An air supply duct extends from the cooling chassis such that an air supply duct outlet on the air supply duct is immediately adjacent the IHS chassis air inlet. An air cooling subsystem is located in the cooling chassis and is operable to cool air that is drawn into the cooling chassis and supply the cooled air to the IHS chassis air inlet through the air supply duct. The IHS chassis may be a conventional IHS chassis that is designed for sub-35 degree Celsius ambient temperatures, and the cooling chassis may be provided for the conventional IHS chassis when used in extreme environments with high ambient temperatures above 35 degrees Celsius.

20 Claims, 9 Drawing Sheets

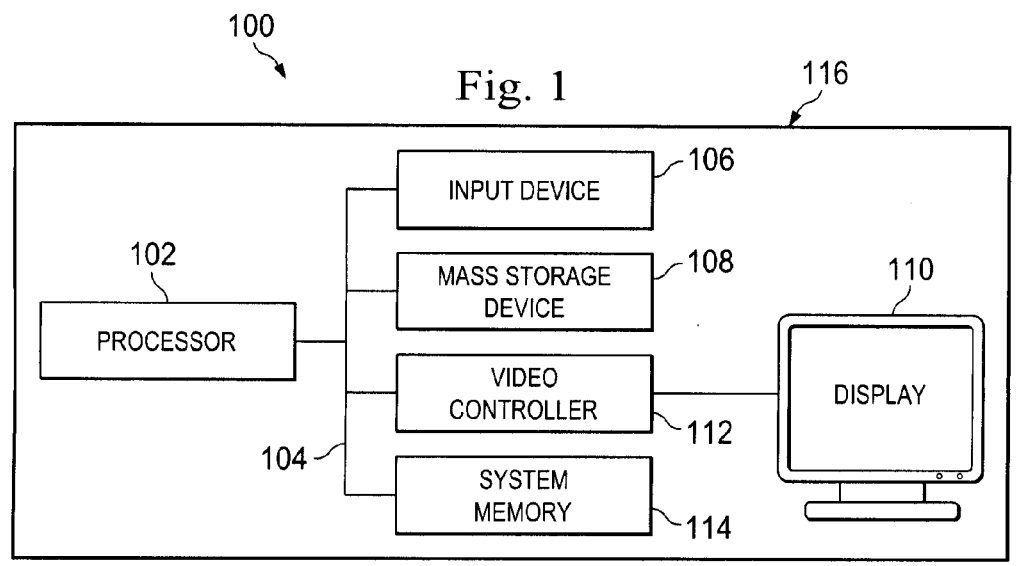
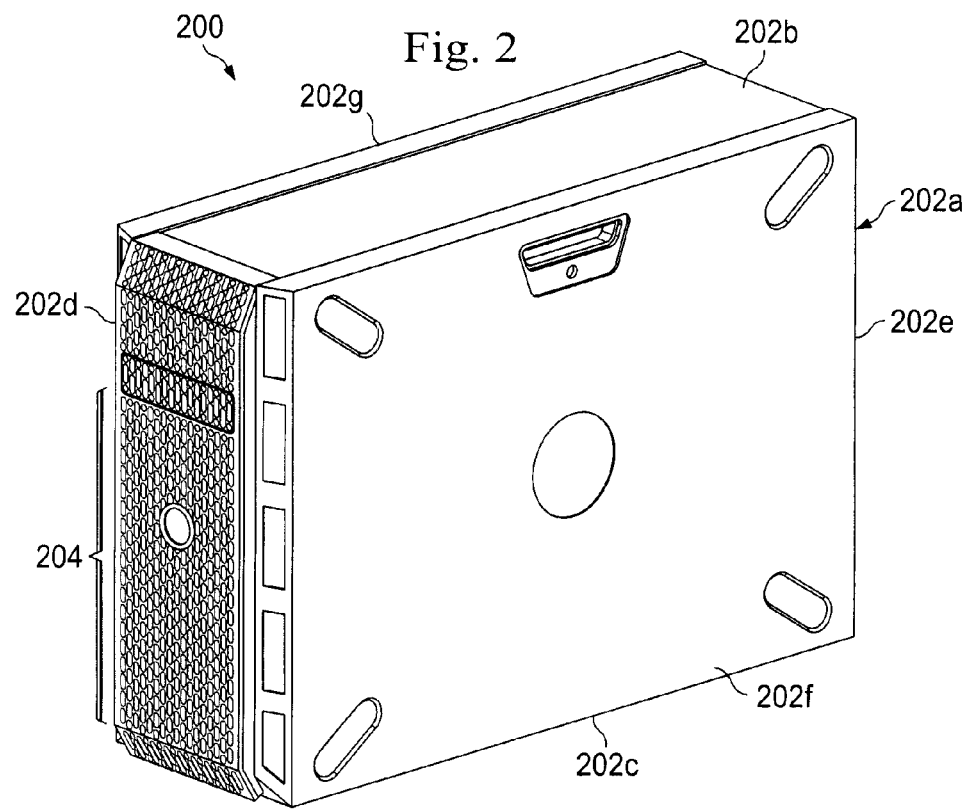

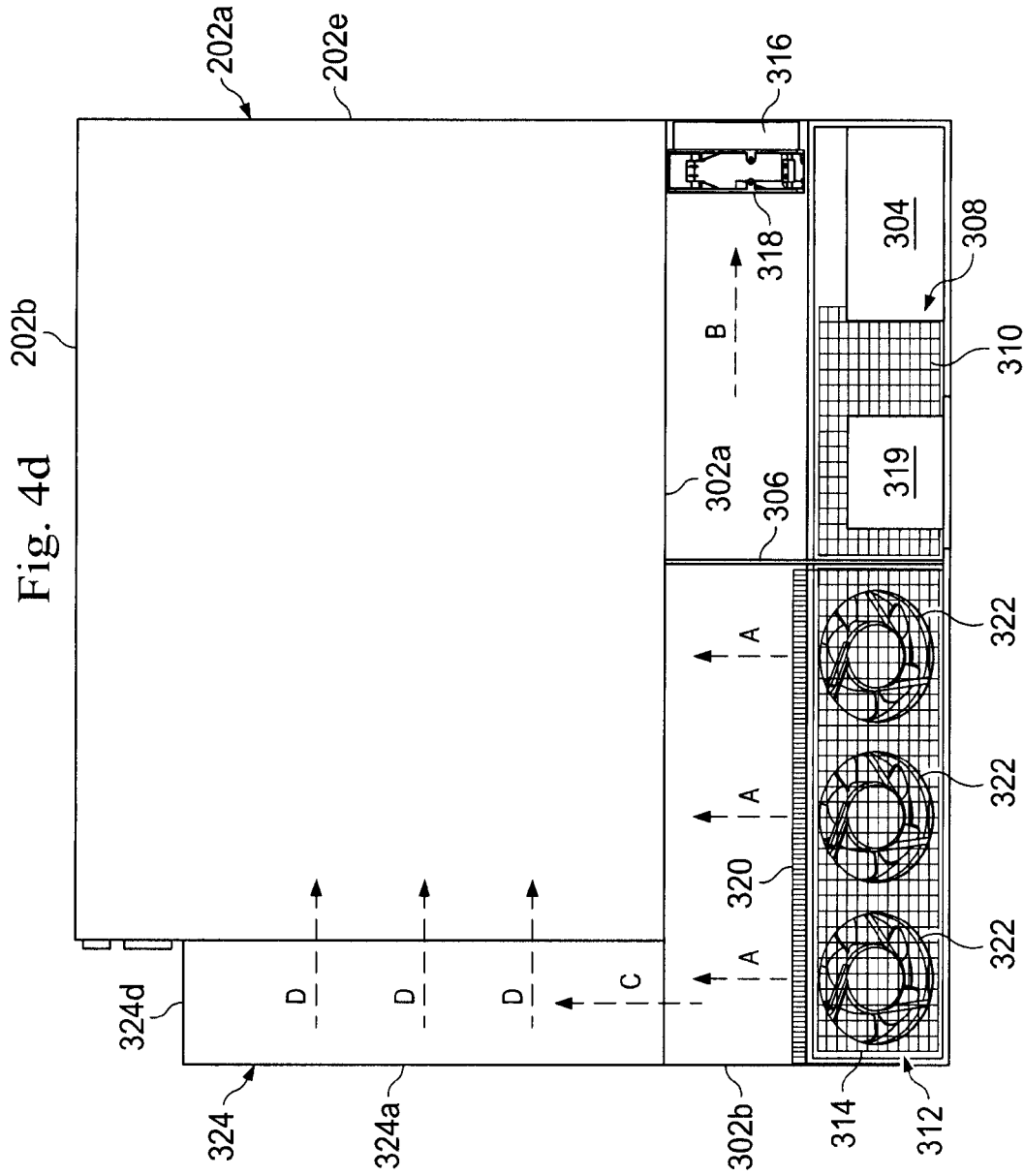

INFORMATION HANDLING SYSTEM COOLING SYSTEM

BACKGROUND

The present disclosure relates generally to information handling systems (IHSs), and more particularly to a cooling system for IHSs used in extreme environments.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs may be used in extreme environments such as, for example, high ambient temperature environments that may be encountered in military applications, telecom applications, manufacturing applications, kiosk applications, remote installation applications, and/or a variety of other high ambient temperature environments known in the art. Conventional IHSs are typically designed to function properly in ambient temperatures below 35 degrees Celsius. However, the high ambient temperatures in extreme environments regularly exceed 35 degrees Celsius and require specialized IHSs that include expensive liquid cooling systems, custom cooling components, and/or custom chassis structures that allow the specialized IHS to withstand the high ambient temperature. This greatly increases the cost of an IHS for the extreme environment IHS user, and requires the IHS manufacturer to design and build the specialized IHS for what is typically a very small subset of their customer base.

Accordingly, it would be desirable to provide a improved cooling system for an IHS

SUMMARY

According to one embodiment, a cooling system includes a cooling chassis having a support base that is operable to support an information handling system (IHS) chassis that defines an IHS chassis air inlet, an air supply duct that extends adjacent the support base such that the air supply duct is operable to direct cooled air to the IHS chassis air inlet when the IHS chassis is supported on the support base, a cooling chassis air inlet defined by the cooling chassis, and an air cooling subsystem located in the cooling chassis and operable to cool air that is drawn through the cooling chassis air inlet and supply the cooled air to the IHS chassis air inlet through the air supply duct.

BRIEF DESCRIPTION OF THE DRAWINGS

FIG. 1 is a schematic view illustrating an embodiment of an IHS.

FIG. 2 is a perspective view illustrating an embodiment of the IHS of FIG. 1.

FIG. 4d is a partial cross-sectional view illustrating an embodiment of the IHS of FIG. 2 coupled to the cooling chassis of FIG. 3.

DETAILED DESCRIPTION

Figure 3:
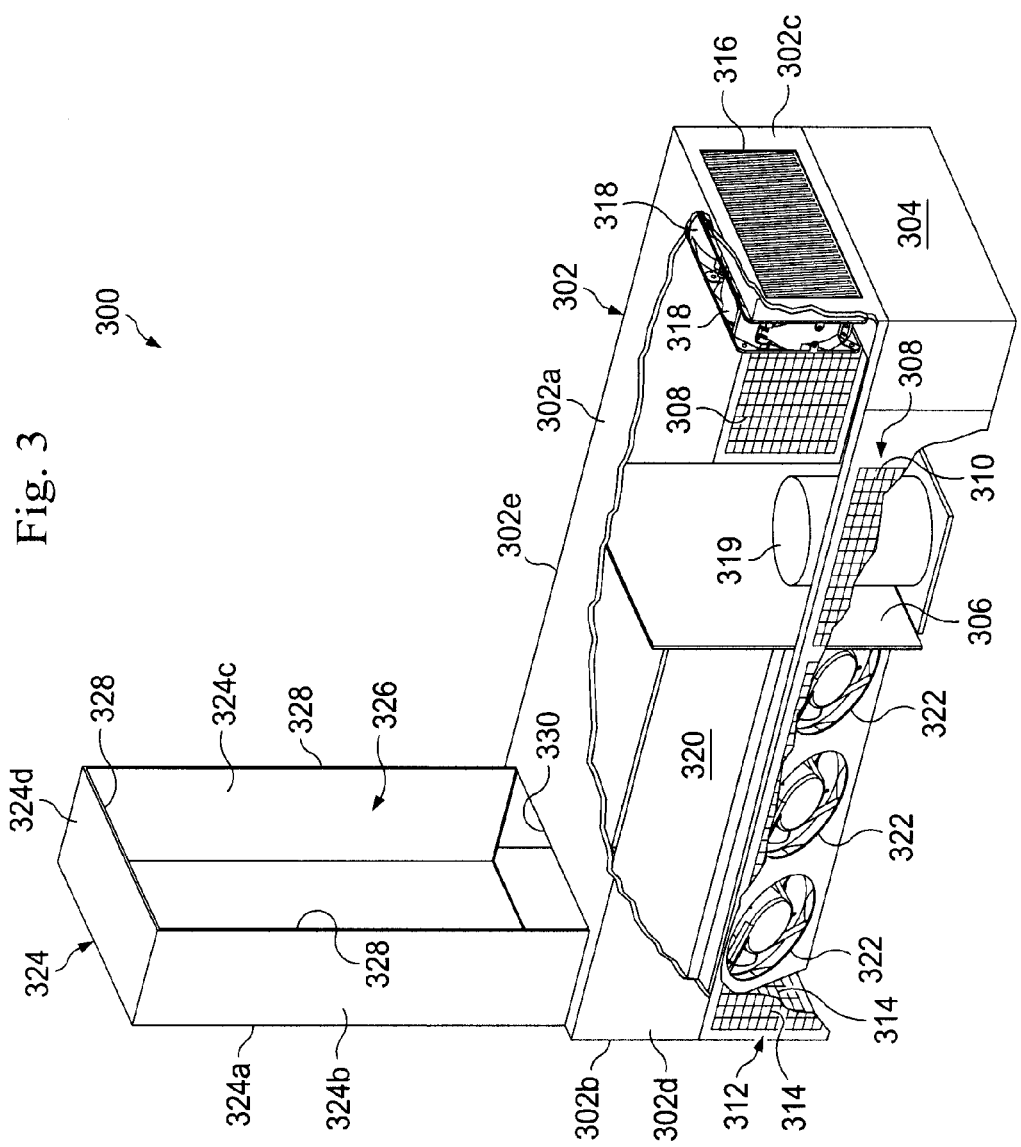
FIG. 3 is a perspective view illustrating an embodiment of a cooling chassis used with the IHS of FIG. 2.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2, an IHS 200 is illustrated. In an embodiment, the IHS 200 may be the IHS 100, described above with reference to FIG. 1 and may include some or all of the IHS components discussed above with reference to FIG. 1. The IHS 200 includes an IHS chassis, which may be the chassis 116 described above with reference to FIG. 1. The IHS chassis includes a base 202a having a top surface 202b, a bottom surface 202c located opposite the base 202a from the top surface 202b, a front surface 202d extending between the top surface 202a and the bottom surface 202b, a rear surface 202e located opposite the base 202a from the front surface 202d and extending between the top surface 202b and the bottom surface 202c, and a pair of side surfaces 202f and 202g located opposite the base 202a from each other and extending between the top surface 202b, the bottom surface 202c, the front surface 202d, and the rear surface 202e. An IHS chassis air inlet 204 is defined by the IHS chassis and, in the illustrated embodiment, is located on the front surface 202d. In an embodiment, the IHS chassis air inlet 204 provides an inlet on the IHS chassis that allows air to flow through the front surface 202d of the IHS chassis and into an IHS housing defined between the top surface 202b, the bottom surface 202c, the front surface 202d, the rear surface 202e, and the side surfaces 202f and 202g. In an embodiment, an air outlet (element 408a illustrated in FIG. 4c) may be defined by the IHS chassis (e.g., on the rear surface 202e) to allow air that enters the IHS housing through the IHS chassis air inlet 204 to exit the IHS housing. Furthermore, the IHS 200 may include air flow devices such as, for example, fans (illustrated in FIG. 4c), in the IHS housing to draw air into and push air out of the IHS housing. In an embodiment, the IHS chassis may be a commodity chassis used by an IHS manufacturer across one or more IHS portfolios (i.e., the IHS chassis may include a variety of different IHS components to provide IHSs with a variety of different performance and operating characteristics.) Furthermore, the IHSs that use the IHS chassis may be designed to operate in temperatures below 35 degree Celsius, as is known in the art for standard or non-specialized IHSs. While the IHS 200 is illustrated as an IHS server tower, one of skill in the art will recognize that a variety of other IHSs will fall within the scope of the present disclosure.

Referring now to FIG. 3, a cooling chassis 300 is illustrated. The cooling chassis 300 includes a support base 302 having a top surface 302a, a front surface 302b extending substantially perpendicularly from a first side of the top surface 302a, a rear surface 302c extending substantially perpendicularly from a second side of the top surface 302a that is opposite the first side, and a pair of sides surface 302d and 302e that extend from opposite sides of the top surface 302a and between the front surface 302b and the rear surface 302c. A support base housing is defined by the support base 302 between the top surface 302a, the front surface 302b, the rear surface 302c, and the side surfaces 302d and 302e.

A power supply unit (PSU) 304 is coupled to the support base 302 and is located immediately adjacent an edge of the rear surface 302c that is opposite the top surface 302a and a portion of the edges of the sides surfaces 302d and 302e that are opposite the top surface 302a. A separator wall 306 is coupled to the support base 302 and extends from the edges of the sides surfaces 302d and 302e that are opposite the top surface 302a such that the separator wall 306 is located midway along the support base 302 and spaced apart from the PSU 304 in a substantially parallel orientation to the PSU 304. In an embodiment, the separator wall 306 extends into the support base housing and divides the support base housing into two sections that are located on opposite sides of the separator wall 306. A pair of condenser air inlets 308 extend from a portion of the edges of the sides surfaces 302d and 302e, respectively, that are opposite the top surface 302a such that the condenser air inlets 308 extend between the separator wall 306 and the PSU 304. A first air inlet housing is defined between the PSU 304, the separator wall 306, and the condenser air inlets 308. In an embodiment, a condenser air inlet filter 310 is located on each of the condenser air inlets 308. A plurality of cooling chassis air inlets 312 extend from portions of the edges of the sides surfaces 302d and 302e, respectively, that are opposite the top surface 302a, and from the edge of the front surface 302b that is opposite the top surface 302a, such that the cooling chassis air inlets 312 extend from the separator wall 306 and adjacent the side surfaces 302e and 302e and front surface 302b, as illustrated in FIG. 3. A second air inlet housing is defined between the separator wall 306 and the cooling chassis air inlets 312. In an embodiment, a cooling chassis air inlet filter 314 is located on each of the cooling chassis air inlets 312.

The cooling chassis 300 includes an air cooling subsystem. In the illustrated embodiment, the air cooling subsystem includes a vapor compressor unit having a condenser 316 that is located on the rear surface 302c of the support base 302. A plurality of fans 318 are located in the support base housing immediately adjacent the condenser 316 and are coupled to the PSU 304 to receive power. The vapor compressor unit in the air cooling subsystem also includes a compressor 319 that is located in the first air inlet housing between the separator wall 306 and the PSU 304. The compressor 319 is coupled to the PSU 304 to receive power. The compressor 319 is coupled to the condenser 316 through cooling fluid conduits (not illustrated) that are located in the cooling chassis 300. The vapor compressor unit in the air cooling subsystem also includes an evaporator 320 that is mounted to the cooling chassis 300 such that it is located between one of the sections of the support base housing and the second air inlet housing, as illustrated in FIG. 3. The evaporator 320 is coupled to the condenser 316 and the compressor 318 through cooling fluid conduits (not illustrated) that are located in the cooling chassis 300. A plurality of fans 322 are located in the second air inlet housing adjacent the evaporator 320 and the cooling chassis air inlets 312. The plurality of fans 322 are coupled to the PSU 304 to receive power. In an embodiment, the vapor compressor unit in the air cooling subsystem includes an expansion valve (not illustrated) coupled to the condenser 316, the compressor 318, and the evaporator 320 through cooling fluid conduits (not illustrated) that are located in the cooling chassis 300. While components of an air cooling subsystem have been described and illustrated, one of skill in the art will recognize that air cooling components may be added to the air cooling subsystem and/or substituted for the components described above while providing an air cooling subsystem that falls within the scope of the present disclosure. For example, the air cooling subsystem may utilize chilled fluids and or other cooling components known in the art.

The cooling chassis 300 includes an air supply duct 324 that extends from the top surface 302a of the support base 302 adjacent the front surface 302b. The air supply duct 324 includes a first wall 324a that extends substantially perpendicularly from the top surface 302a of the support base 302, a pair of side walls 324b and 324c that extend substantially perpendicularly from opposite edges of the first wall 324a and from the top surface 302a of the support base 302, and a top wall 324d that extends between the edges of the first wall 324a and the sides walls 324b and 324c that are opposite the top surface 302a of the support base 302. An air supply duct channel 326 is defined between the first wall 324a, the side walls 324b and 324c, and the top wall 324d. A plurality of edges on the first wall 324a, the side walls 324b and 324c, and the top wall 324d provide an air supply duct outlet 328. In an embodiment, includes a sealing device such as, for example, a gasket, coupling members (e.g., latches), and/or other sealing device known in the art is located on the air supply duct outlet 328. An airflow aperture 330 is defined on the top surface 302a of the support base 302 adjacent the air supply duct 324 and extends through the top surface 302a from the air supply duct channel 326 to the support base housing.

Figure 4B:
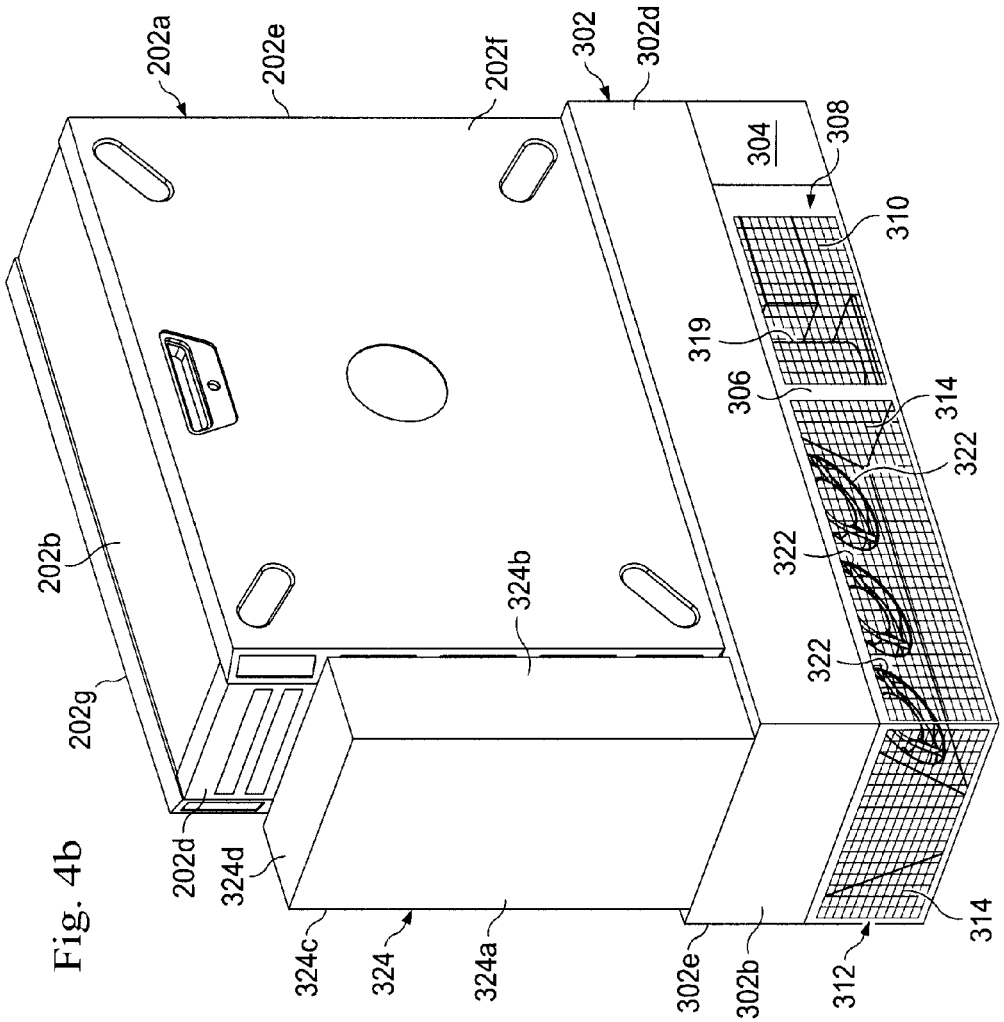
FIG. 4b is a front perspective view illustrating an embodiment of the IHS of FIG. 2 coupled to the cooling chassis of FIG. 3.
Figure 4A:
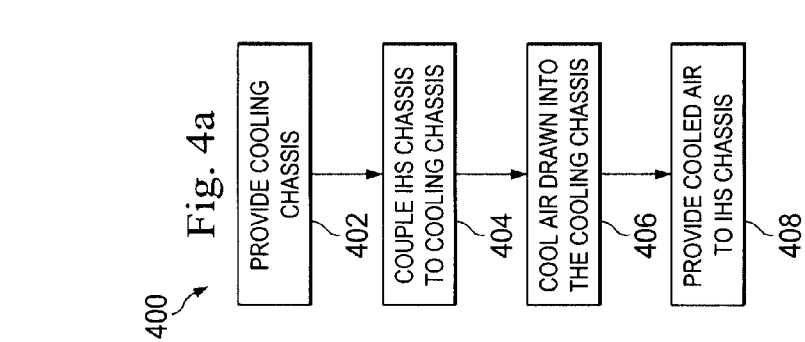
FIG. 4a is a flow chart illustrating an embodiment of a method for cooling an IHS.
Figure 4C:
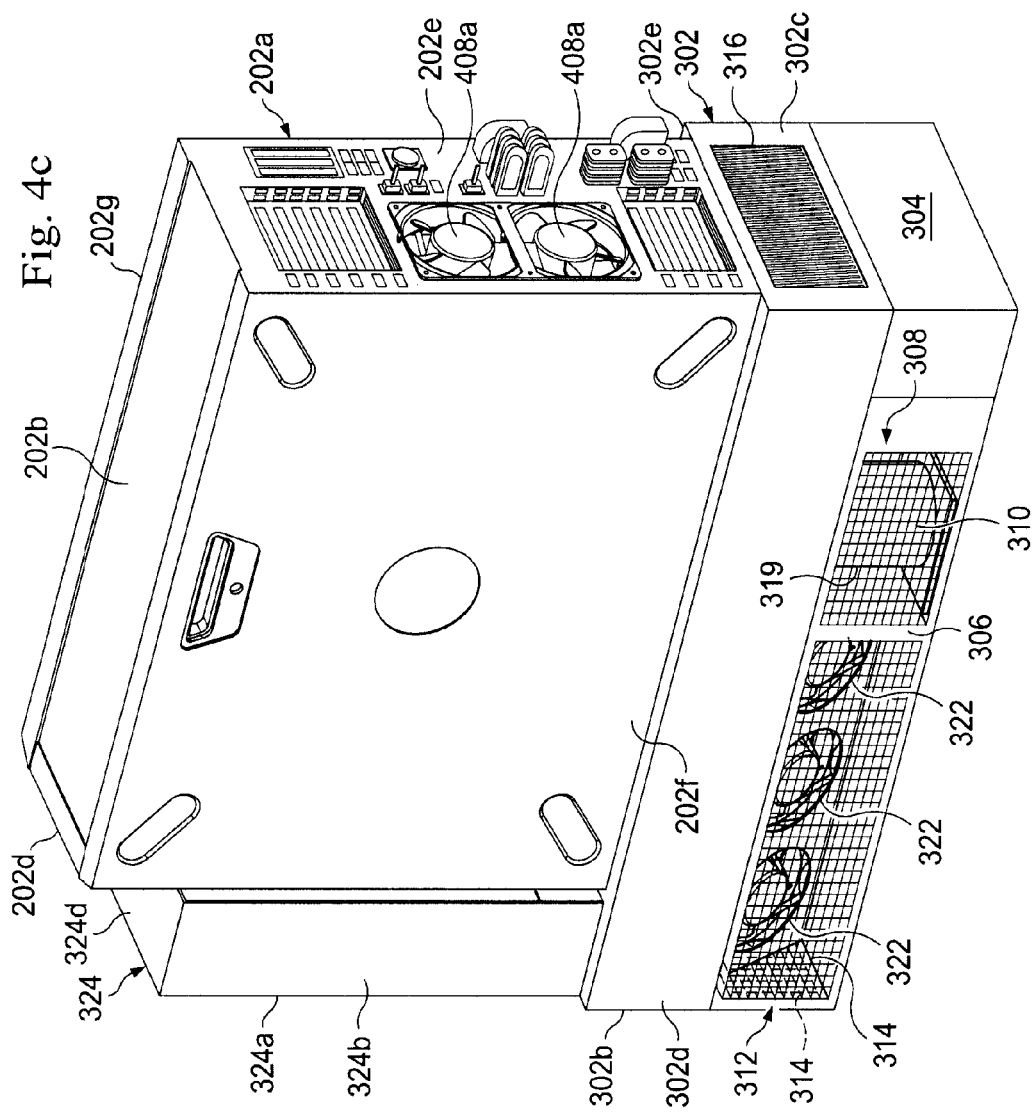
FIG. 4c is a rear perspective view illustrating an embodiment of the IHS of FIG. 2 coupled to the cooling chassis of FIG. 3.

Referring now to FIGS. 4a, 4b, and 4c, a method 400 for cooling an IHS is illustrated. The method 400 begins at block 402 where a cooling chassis is provided. In an embodiment, the cooling chassis 300, described above with reference to FIG. 3, is provided. The method 400 then proceeds to block 404 where an IHS chassis is coupled to the cooling chassis. In an embodiment, the IHS 200, described above with reference to FIG. 3, is coupled to the cooling chassis 300 by positioning the IHS chassis on the support base 302 such that the bottom surface 202c of the IHS chassis engages the top surface 302a of the support base 302, as illustrated in FIGS. 4b and 4c. With the IHS chassis coupled to the cooling chassis 300, the IHS chassis air inlet 204 on the IHS 200 is positioned adjacent the air supply duct outlet 328 on the air supply duct 324. In an embodiment, a sealing device on the air supply duct outlet 328 engages or is coupled to the IHS chassis in order to provide a seal between the IHS chassis air inlet 204 and the air supply duct outlet 328. For example, a gasket sealing device may engage the front surface 202d of the IHS chassis (e.g., the front surface 202d, the sides surfaces 202f and 202g, etc.) to provide the seal, latch sealing devices may engage the IHS 200 to provide the seal, and/or a variety of sealing mechanisms may be used to provide the seal between the IHS chassis air inlet 204 and the air supply duct outlet 328.

Referring now to FIGS. 4a and 4d, the method 400 then proceeds to block 406 where air is drawn into the cooling chassis and cooled. At block 406, through operation of the fans 322, air outside of the cooling chassis 300 is drawn through the cooling chassis air inlets 312, into the second air inlet housing, and directed through the evaporator 320. In an embodiment, the air drawn through the cooling chassis air inlets 312 is filtered through the cooling chassis air inlet filters 314. In an embodiment, the fans 322 are operable to overcome airflow restrictions that may result from the cooling chassis air inlet filers 314 or contamination of the cooling chassis air inlet filters 314. At block 406, as air is being directed through the evaporator 320 by the fans 322, the air cooling subsystem is operated such that a cooling fluid (e.g., a refrigerant and/or other cooling fluids know in the art) that has left the evaporator 320 through a cooling fluid conduit in a gas state is compressed by the compressor 319, leaves the compressor 319 and travels through a cooling fluid conduit to the condenser 316 where the cooling fluid is condensed into a liquid and absorbs heat from the environment, and leaves the condenser 316 and travels through a cooling fluid conduit to the evaporator 320 where the cooling fluid is converted to a gas state and expels heat into the environment. One of skill in the art will recognize that the operation of the air cooling subsystem causes the air that is directed by the fans 322 through the evaporator 320 to be cooled (to a temperature that is lower than that of the ambient air) such that cooled air is provided to the section of the support base housing that is opposite the evaporator 320 from the fans 322, as indicated by the arrows A in FIG. 4d. During operation of the air cooling subsystem, at block 406, through operation of the fans 318, air outside of the cooling chassis 300 is also drawn through the condenser air inlets 308, into the first air inlet housing, and directed through the condenser 316, as indicated by the arrow B in FIG. 4d. In an embodiment, the air drawn through the condenser air inlets 308 is filtered through the condenser air inlet filters 310. In an embodiment, the fans 318 are operable to overcome airflow restrictions that may result from the condenser air inlet filers 310 or contamination of the condenser air inlet filters 310. During operation of the air cooling subsystem, the separator wall 306 may operate to ensure the air cooled through the evaporator 320 and provided to support base housing is kept separate from uncooled air drawn through the condenser air inlets 308 and directed to the condenser 316. In an embodiment, the air cooling subsystem may include a drain in order to allow the air cooling subsystem to act as a dehumidifier.

The method 400 then proceeds to block 408 where cooled air is provided to the IHS chassis. Air directed through the evaporator 320 to provide cooled air into the support base housing is further directed by the support base housing through the airflow aperture 330 defined on the top surface 302a of the support base 302 and into the air supply duct channel 326 defined by the air supply duct 324, as indicated by the arrow C in FIG. 4d. Cooled air in the air supply duct channel 326 is directed by the air supply duct 324 into the IHS housing through the air supply duct outlet 328 and the IHS chassis air inlet 204, as indicated by the arrows D in FIG. 4d. The cooled air provided to the IHS housing cools IHS components located in the IHS housing. The air used to cool the IHS components may be directed out of the IHS housing through IHS chassis air outlets 408a, illustrated in FIG. 4c, using, for example, the fans located adjacent the IHS chassis air outlets 408a in the illustrated embodiment.

Figure 5:
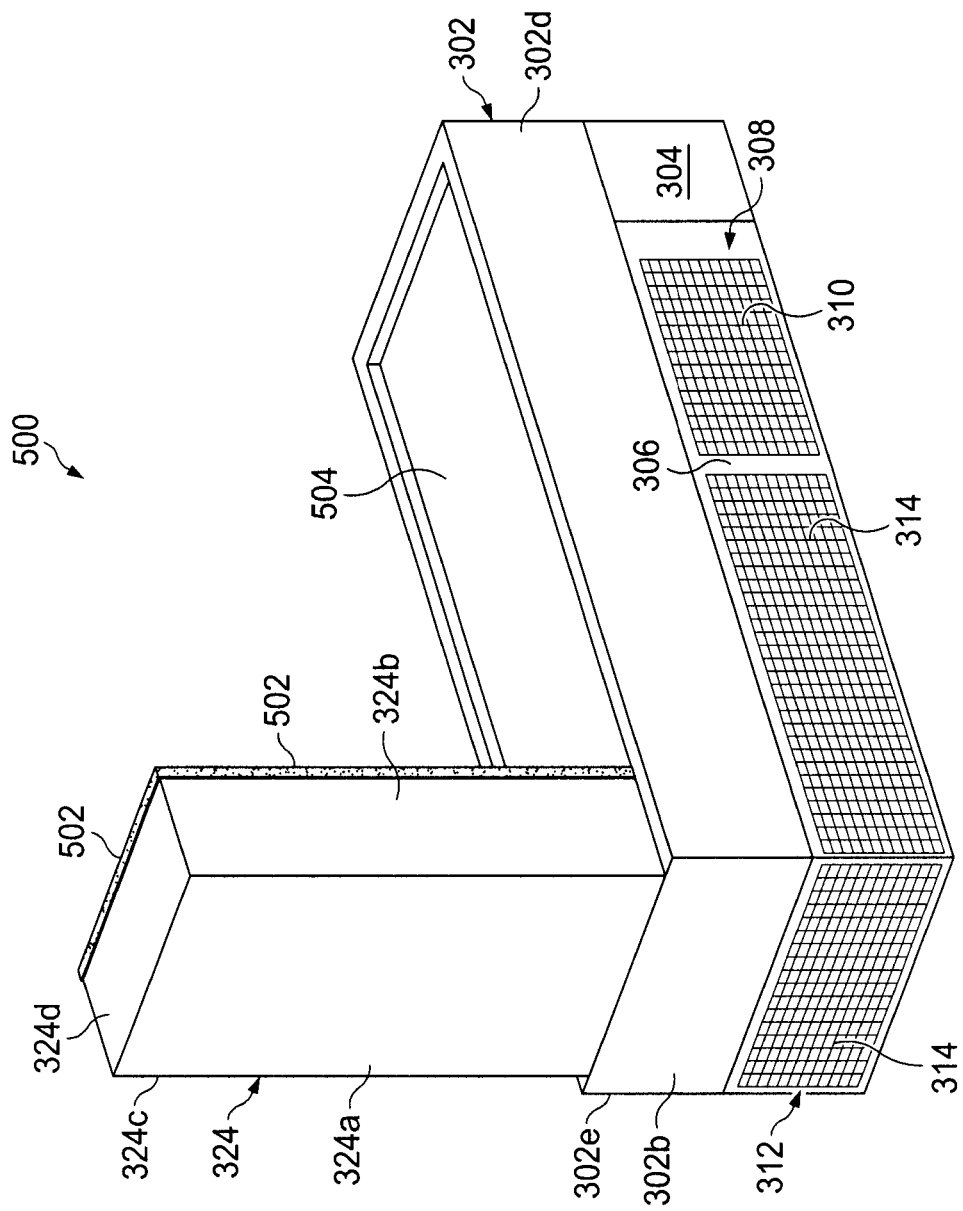
FIG. 5 is a perspective view illustrating an embodiment of a cooling chassis.

Referring now to FIG. 5, a cooling chassis 500 is illustrated that is substantially similar in structure and operation to the cooling chassis 300 described above with reference to FIGS. 3, 4a, 4b, 4c, and 4d, with the provision of a gasket sealing device 502 located on the air supply duct outlet 328 and an IHS chassis coupling feature 504 that includes a chassis channel that is defined by the support base 302 and extends into the top surfaces 302a of the support base 302. At block 404 of the method 400, discussed above, the IHS chassis may engage the IHS chassis coupling feature 504 to couple the IHS 200 to the support base 302. In an embodiment, the IHS chassis coupling feature 504 may be dimensioned such that bottom surface 202c of the IHS 200 fits snugly into the chassis channel and the engagement of the IHS 200 and support base 302 resists relative movement of the IHS 200 and the support base 302. Furthermore, the IHS chassis coupling feature 504 may be adjustable to allow a variety of differently dimensioned IHS chassis to be coupled to the support base 302. With the IHS chassis engaging the IHS chassis coupling feature 504, the air supply duct 324 may be oriented such that the gasket sealing device 502 engages the front surface 202d of the IHS 200 to compress the gasket sealing device 502 and provide a seal between the air supply duct 324 and the front surface 202d of the IHS 200. In an embodiment, the IHS chassis coupling feature 504 may include features (e.g., latches) that engage the IHS chassis to secure the IHS chassis to the support base 302.

Figure 6:
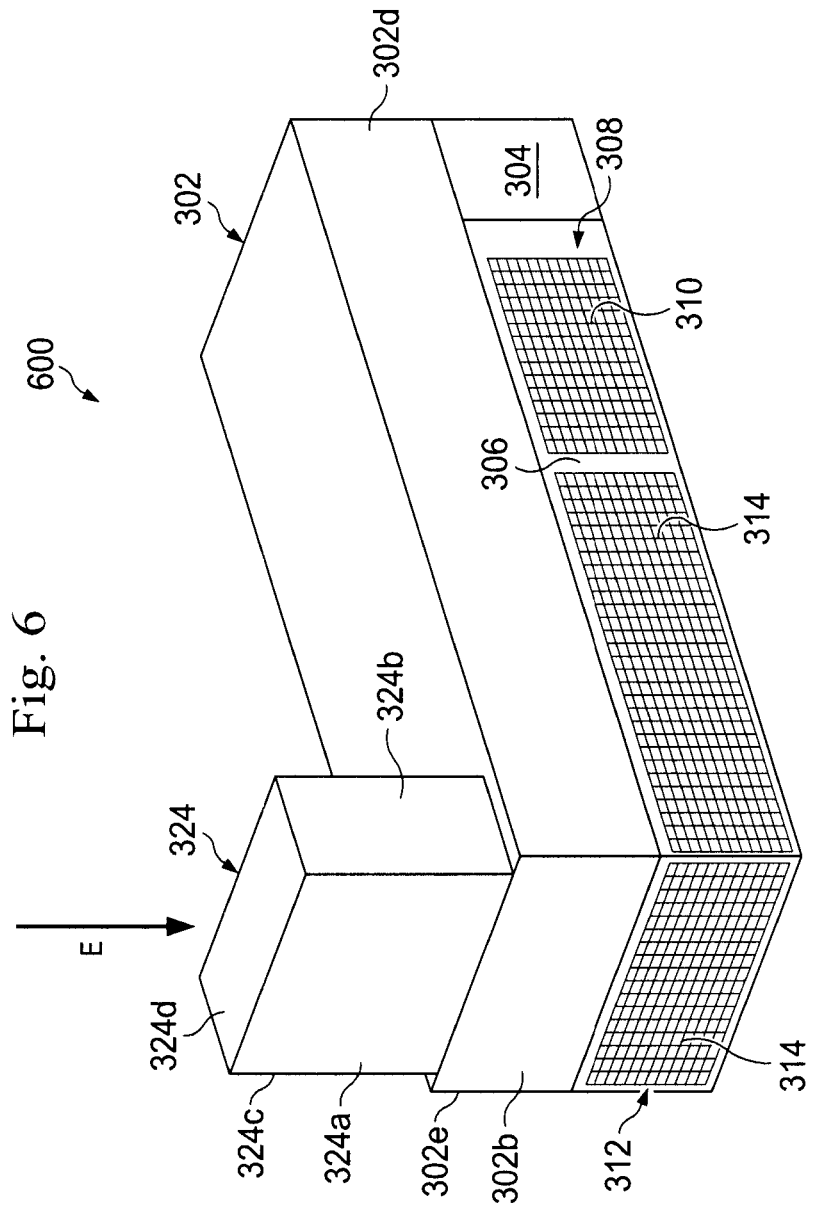
FIG. 6 is a perspective view illustrating an embodiment of a cooling chassis with a movable air supply duct.

Referring now to FIG. 6, a cooling chassis 600 is illustrated that is substantially similar in structure and operation to the cooling chassis 300 described above with reference to FIGS.

3, 4a, 4b, 4c, and 4d, with the provision that the air supply duct 324 is moveable relative to the support base 302. In an embodiment, the air supply duct 324 on the cooling chassis 600 may be moveably coupled to the support base 302 by a sliding connection to the support base 302, through a telescoping structure of the air supply duct 324, and/or using a variety of other extendable couplings known in the art. Thus, the air supply duct 324 on the cooling chassis 600 may move in a direction E from the position illustrated in FIG. 3 to the position illustrated in FIG. 6. One of skill in the art will recognize that the moveable air supply duct 324 on the cooling chassis 600 allows the air supply duct 324 to be moved in order to access the front surface 202d of the IHS 200, to adjust the air supply duct 324 for IHS chassis that have IHS chassis air inlets that are in different positions, and/or to provide a variety of other functionality. In an embodiment, the side surfaces 324b and 324c may be moveable relative to each other to allow further adjustment of the dimensions of the air supply duct channel 326 for optimal use with different IHS chassis.

Figure 7:
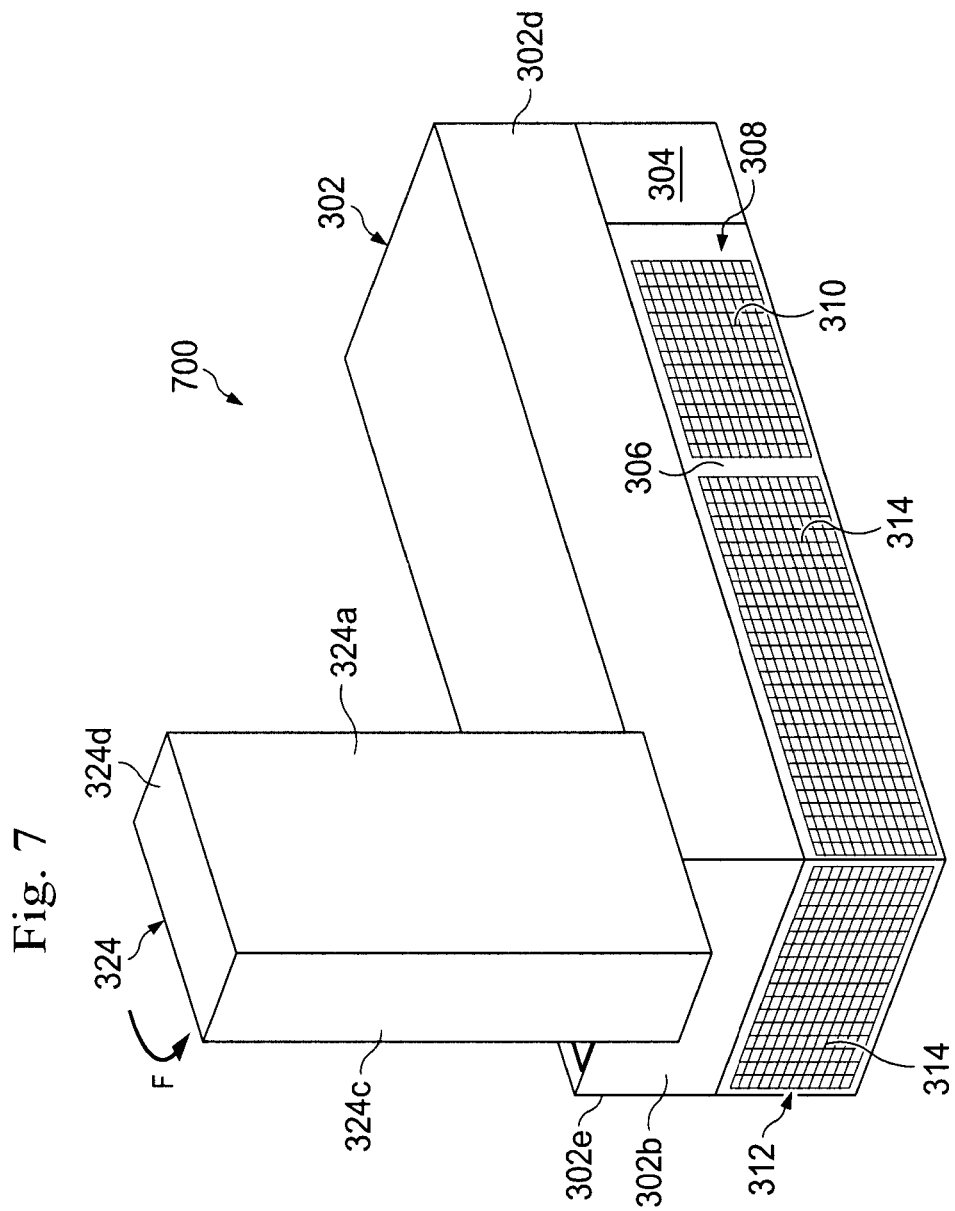
FIG. 7 is a perspective view illustrating an embodiment of a cooling chassis with a movable air supply duct.

Referring now to FIG. 7, a cooling chassis 700 is illustrated that is substantially similar in structure and operation to the cooling chassis 300 described above with reference to FIGS. 3, 4a, 4b, 4c, and 4d, with the provision that the air supply duct 324 is moveable relative to the support base 302. In an embodiment, the air supply duct 324 on the cooling chassis 600 may be moveably coupled to the support base 302 by a hinged connection to the support base 302. Thus, the air supply duct 324 on the cooling chassis 600 may rotate in a direction F from the position illustrated in FIG. 3 to the position illustrated in FIG. 7. One of skill in the art will recognize that the moveable air supply duct 324 on the cooling chassis 600 allows the air supply duct 324 to be moved in order to access the front surface 202d of the IHS 200 and/or to provide a variety of other functionality. In an embodiment, the hinged connection between the air supply duct 324 and the support base 302 may be located in different positions than illustrated in FIG. 7. For example, the hinged connection may be located between the edge of the first wall 324a on the air supply duct 324 and the top surface 302a of the support base 302 such that the air supply duct 324 rotates until the first wall 324 is substantially parallel with the top surface 302a of the support base 302.

Figure 8:
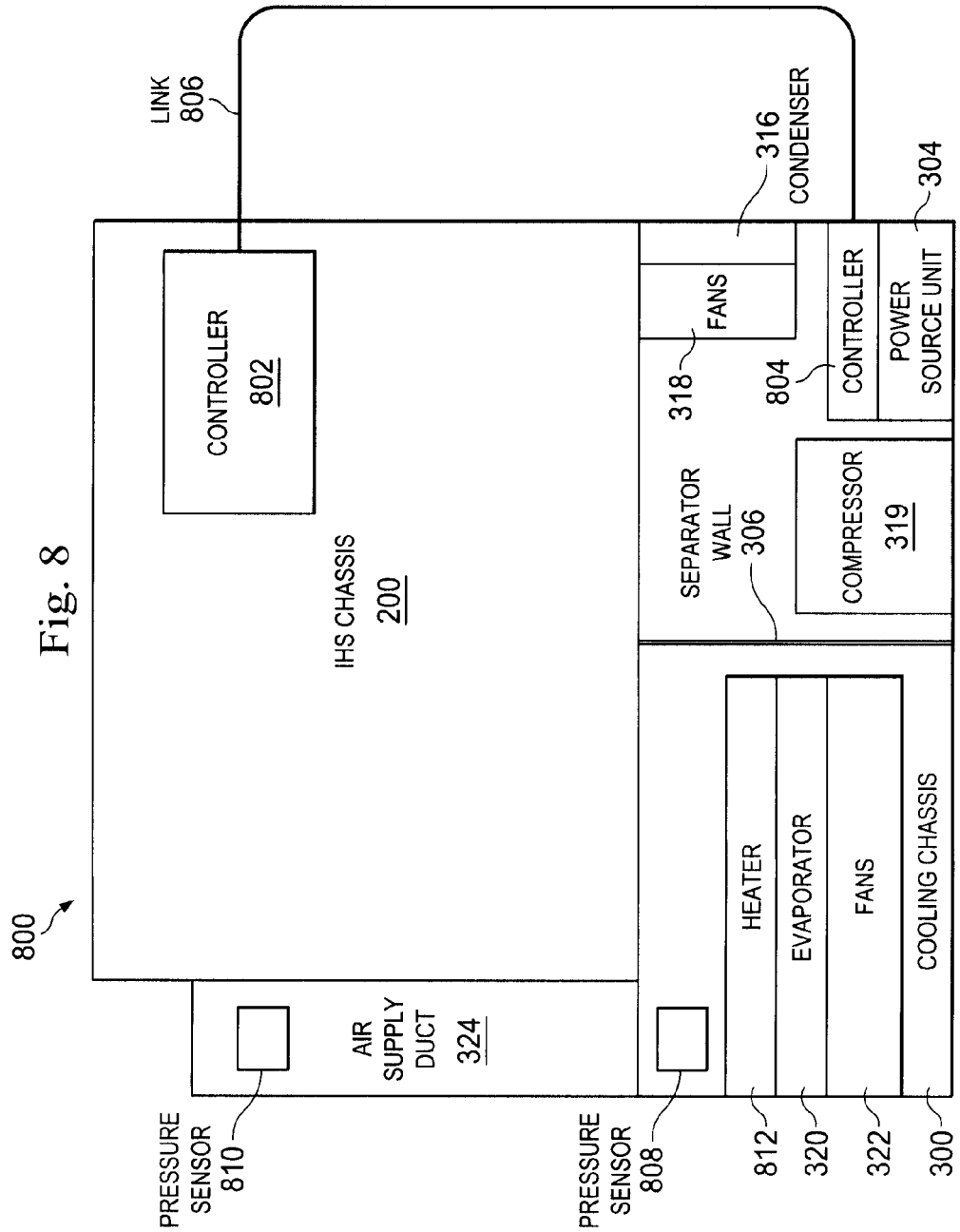
FIG. 8 is a schematic view illustrating an embodiment of an IHS cooling system.

Referring now to FIG. 8, an IHS cooling system 800 that includes the IHS 200 and the cooling chassis 300, described above, is illustrated. The IHS 200 may include a controller 802 that is coupled to a processor located in the IHS (e.g., the processor 102 described above with reference to FIG. 1). The cooling chassis 300 may include a controller 804 that may be coupled to one or more of the PSU 304, the fans 318, the compressor 319, the fans 322, and/or other components of the cooling chassis 300. In an embodiment, when the IHS chassis is positioned on the cooling chassis 300, a link 806 may be provided between the controller 802 in the IHS 200 and the controller 804 in the cooling chassis 300. For example, the link 806 is a physical link such as a cable (e.g., a universal serial bus (USB) cable). In another embodiment the link 806 is a wireless link (e.g., a Bluetooth wireless link). In an embodiment, the positioning of the IHS 200 on the cooling chassis 300 may actuate an actuator (e.g., a mechanical switch, an optical switch, a magnetic switch, an electrical connection, and/or a variety of other actuators known in the art) that causes the controllers 802 and 804 to create the wireless link 806.

In an embodiment, the coupling of the IHS 200 to the cooling chassis 300 may result in the adjusting of the thermal control properties in the IHS 200 (e.g., in response to positioning of the IHS chassis on the cooling chassis 300 and actuating an actuator). For example, the IHS 200 may adjust the operating parameters of or even turn off fans that are housed in the IHS housing upon being coupled to the cooling chassis 300. Furthermore, the link 806 between the controllers 802 and 804 may be operable to permit operating parameters from the cooling chassis 300 to be input to the controller 802 in the IHS 200. For example, the controller 802 may be a base management controller (BMC) thermal control in the IHS 200, and the BMC thermal control may receive inputs from the controller 804 in the cooling chassis 300 that are used to adjust the operation of fans that are housed in the IHS 200. In another embodiment, the link 806 may allow the fans 322 in the cooling chassis 300 and the fans housed in the IHS 200 to be coordinated (e.g., the fans 322 may be used to augment or eliminate the use of fans housed in the IHS chassis by communication through the link 806 that allows the fans housed in the IHS chassis 200 to be slowed or even stopped in response to the use of the fans 322 or an increase in the fan speed of the fans 322.) In another embodiment, the cooling chassis 300 may be operated to provide redundant airflow to the IHS 200 in case of fan failure in the IHS 200.

In addition, a pressure sensor 808 may be positioned on an outside surface of the cooling chassis 300 to measure ambient air pressure, and a pressure sensor 810 may be positioned in the air supply duct channel 316 to measure air pressure within the air supply duct channel 326. Outputs from the pressure sensors 808 and/or 810 may be provided to the controller 804 and used to control the fans 322 such that the pressure in the air supply duct channel 326 is sufficient to ensure proper air flow through the IHS housing and thus proper cooling of the IHS (e.g., the fan speed of the fans 322 may be adjusted to increase the pressure of cooled air in the air supply duct in order to ensure that the cooled air is at a pressure sufficient to overcome ambient pressure and flow through the IHS housing and out of the IHS chassis 202.) In another embodiment, the IHS 200 is operable to control the fans (e.g., the fans 322) in the cooling chassis 300 when the link 806 is provided as discussed above, while the cooling chassis 300 will control the fans (e.g., the fans 322) when the link 806 is not provided (e.g., the fan 322 may be controlled by the cooling chassis 300 using output pressure measured by the pressure sensor 810.)

While the cooling chassis 300 has been described above as providing cooled air to the IHS 200 in extreme environments that include high ambient temperatures, modifications to the cooling chassis 300 may be provided for different extreme environments. For example, extreme environments with very low ambient temperatures may effect the performance of the IHS 200. In such environments, a heater 812 may replace the air cooling subsystem or be added to the cooling chassis 300 along with the air cooling subsystem immediately adjacent the evaporator 320, as illustrated in FIG. 8. The heater 812 may be coupled to the PSU 304 to receive power. In extreme environments that include very cold temperatures (e.g., below 0 degrees Celsius), the heater 812 and fans 322 may be activated to draw air from outside the cooling chassis 300, direct the air through the heater 812 to provide heated air to the support base housing, direct the heated air into the air supply duct channel 326, and provide the heated air to the IHS housing substantially as described above for providing cooled air to the IHS housing. The heated air may then be used to heat IHS component in the IHS 200 to allow proper functioning in the extreme environment.

Thus, a cooling chassis has been described that is operable to couple to an IHS chassis that includes an IHS that is designed for normal environments (e.g., below 35 degrees Celsius.) In an embodiment, the cooling chassis is a module refrigeration unit that is operable to cool air and provide the cooled air to an individual IHS chassis in order to allow the IHS to function in an extreme environment (e.g., an environment with temperatures above 35 degrees Celsius.) The cooling chassis may be dimensioned and/or adjustable to couple to a variety of standard IHS chassis such that IHS users may purchase the cooling chassis for use with a variety of different IHS's, allowing an IHS manufacturer to produce standard IHSs using commodity components and provide IHS users with the option to purchase the cooling chassis in order to use those standard IHSs in extreme environments, rather than having to customize the IHS with specialized components for the extreme environment. Thus, standard IHSs may be manufactured with no configuration limits and without a separate design and qualification cycle requirement in order to ensure proper operation in the extreme environment.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cooling system, comprising:
   a cooling chassis including a support base that is operable to support an information handling system (IHS) chassis that defines an IHS chassis air inlet;
   an air supply duct that extends adjacent the support base such that the air supply duct is operable to direct cooled air to the IHS chassis air inlet when the IHS chassis is supported on the support base;
   a cooling chassis air inlet defined by the cooling chassis; and
   an air cooling subsystem located in the cooling chassis and operable to cool air that is drawn through the cooling chassis air inlet and supply the cooled air to the IHS chassis air inlet through the air supply duct.

2. The system of claim 1, wherein the air supply duct is moveable relative to the support base.

3. The system of claim 1, wherein the air supply duct includes at least one sealing device that is operable to engage the IHS chassis when the IHS chassis is supported on the support base.

4. The system of claim 1, further comprising:
   a filter located on the cooling chassis air inlet.

5. The system of claim 1, further comprising:
   a control system coupled to and operable to control the air cooling subsystem, wherein the control system is operable to monitor an IHS housed in the IHS chassis in order to control the air cooling subsystem.

6. The system of claim 1, further comprising:
   at least one fan located in the cooling chassis and adjacent the cooling chassis air inlet.

7. The system of claim 1, wherein the air cooling subsystem includes a compressor, a condenser, and an evaporator.

8. The system of claim 1, wherein the support base includes at least one IHS chassis coupling feature that is operable to couple the IHS chassis to the support base when the IHS chassis is supported on the support base.

9. An information handling system (IHS), comprising:
   an IHS chassis defining an IHS chassis air inlet;
   a processor housed in the IHS chassis;
   a memory housed in the IHS chassis and coupled to the processor;
   a cooling chassis supporting the IHS chassis;
   an air supply duct located on the cooling chassis such that an air supply duct outlet on the air supply duct is immediately adjacent the IHS chassis air inlet; and
   an air cooling subsystem located in the cooling chassis and operable to cool air that is drawn into the cooling chassis and supply the cooled air to the IHS chassis air inlet through the air supply duct.

10. The system of claim 9, wherein the air supply duct is moveable relative to the cooling chassis to provide access to an IHS chassis front surface on the IHS chassis.

11. The system of claim 9, wherein the air supply duct includes at least one sealing device providing a seal between the air supply duct outlet and the IHS chassis air inlet.

12. The system of claim 9, further comprising:
    a cooling chassis air inlet defined by the cooling chassis; and
    a filter located on the cooling chassis air inlet.

13. The system of claim 9, further comprising:
    a control system coupled to the processor and the air cooling subsystem, wherein the control system monitors the IHS through the processor in order to control the air cooling subsystem.

14. The system of claim 9, further comprising:
    at least one fan located in the cooling chassis and operable to draw air into the cooling chassis.

15. The system of claim 9, wherein the air cooling subsystem includes a compressor, a condenser, and an evaporator.

16. The system of claim 9, wherein the cooling chassis includes at least one IHS chassis coupling feature that couples the IHS chassis to the cooling chassis.

17. A method for cooling an information handling system (IHS), comprising:
    providing a cooling chassis that includes an air cooling subsystem and an air supply duct;
    coupling an IHS chassis to the cooling chassis such that an IHS chassis air inlet defined by the IHS chassis is positioned adjacent the air supply duct;
    cooling air that is drawn into the cooling chassis using the air cooling subsystem; and
    providing the cooled air to the IHS chassis through the IHS chassis air inlet using the air supply duct.

18. The method of claim 17, further comprising:
    moving the air supply duct relative to the cooling chassis to provide access to an IHS chassis front panel on the IHS chassis.

19. The method of claim 17, further comprising:
    providing a seal between the air supply duct and the IHS chassis air inlet.

20. The method of claim 17, further comprising:
    filtering air that is drawn into the cooling chassis.

* * * * *